United States Patent
Hoa et al.

(10) Patent No.: US 7,415,702 B1
(45) Date of Patent: Aug. 19, 2008

(54) METHOD FOR ZERO OVERHEAD SWITCHING OF ALTERNATE ALGORITHMS IN A COMPUTER PROGRAM

(75) Inventors: Jeffery Hoa, Foothill Ranch, CA (US); Derek William Paul, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 586 days.

(21) Appl. No.: 11/039,314

(22) Filed: Jan. 20, 2005

(51) Int. Cl.
*G06F 9/45* (2006.01)

(52) U.S. Cl. .................................... 717/159
(58) Field of Classification Search ......... 717/158–160, 717/162–163
See application file for complete search history.

(56) References Cited

U.S. PATENT DOCUMENTS

| | | | |
|---|---|---|---|
| 5,121,003 A | 6/1992 | Williams | |
| 5,513,132 A | 4/1996 | Williams | |
| 5,835,734 A * | 11/1998 | Alkalaj et al. | 710/104 |
| 6,463,583 B1 * | 10/2002 | Hammond | 717/162 |
| 6,546,553 B1 * | 4/2003 | Hunt | 717/174 |
| 6,708,330 B1 * | 3/2004 | Moberg et al. | 717/158 |
| 6,779,187 B1 * | 8/2004 | Hammond | 719/331 |
| 7,290,252 B2 * | 10/2007 | Diedrich et al. | 717/145 |
| 2002/0100034 A1 * | 7/2002 | Croix | 717/163 |
| 2003/0097581 A1 * | 5/2003 | Zimmer | 713/200 |
| 2005/0071833 A1 * | 3/2005 | Rothman et al. | 717/153 |

OTHER PUBLICATIONS

David Cortesi, "React Real-Time Programmer's Guide", Silicon Graphics, Inc., 1995; retrieved from http://techpubs.sgi.com/library/manuals/2000/007-2499-001/pdf/007-2499-001.pdf.*
David, A. Solomon, Inside Windows NT, Second Edition, Microsoft Press, 1998.*
Pelachaud et al. "Embodied comtextual agent in information delivering application" Jul. 2002 ACM, AAMAS '02, pp. 758-765.*
Ferrari et al. "An authorization system for digital libraries", Aug. 2002, Springer-Verlag New York, Inc. The VLDB Journal, vol. 11, Issue1, pp. 58-67.*

* cited by examiner

*Primary Examiner*—Wei Y. Zhen
*Assistant Examiner*—Anna Deng
(74) *Attorney, Agent, or Firm*—Alfred W. Kozak; Robert P. Marley; Charles A. Johnson

(57) ABSTRACT

A system wherein a Caller Application is enabled to reduce latency after a First Call to a Data Link Library after which a stub function provides direct access to a selected algorithm's work function for execution by a processor. A Hardware Abstraction Layer receives information from multiple CPU's to determine the appropriately compatible algorithm for the processor that is to be utilized.

6 Claims, 9 Drawing Sheets

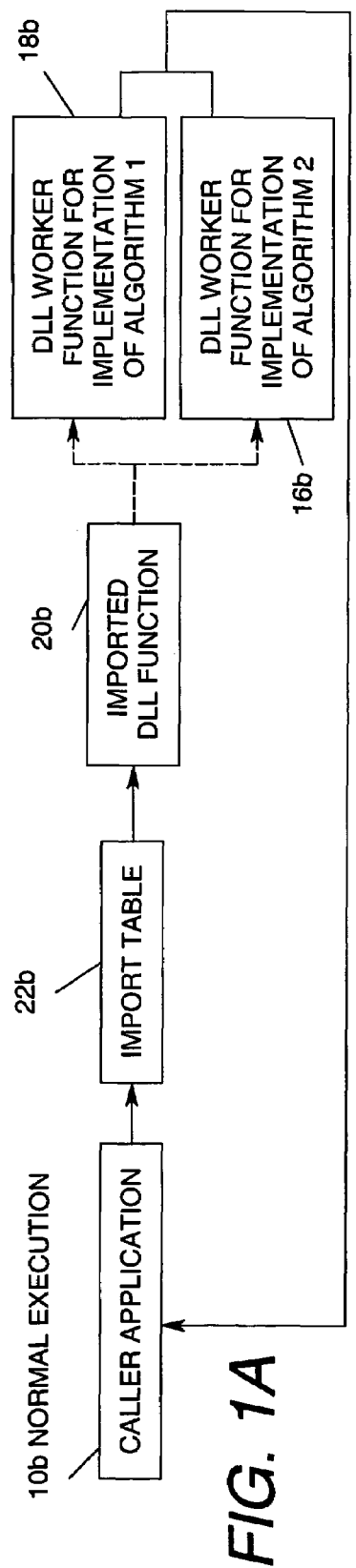
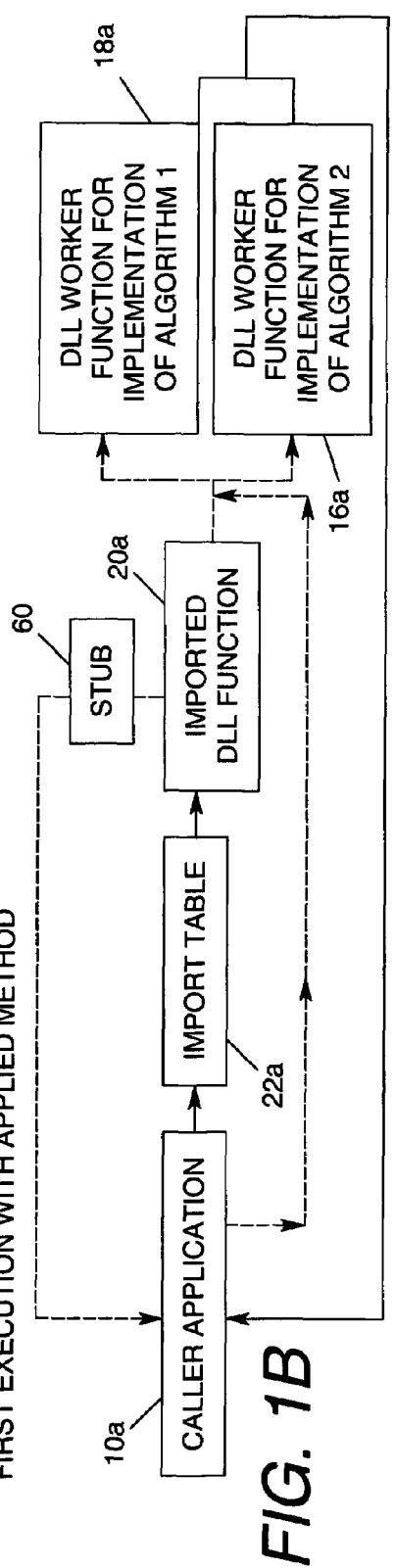
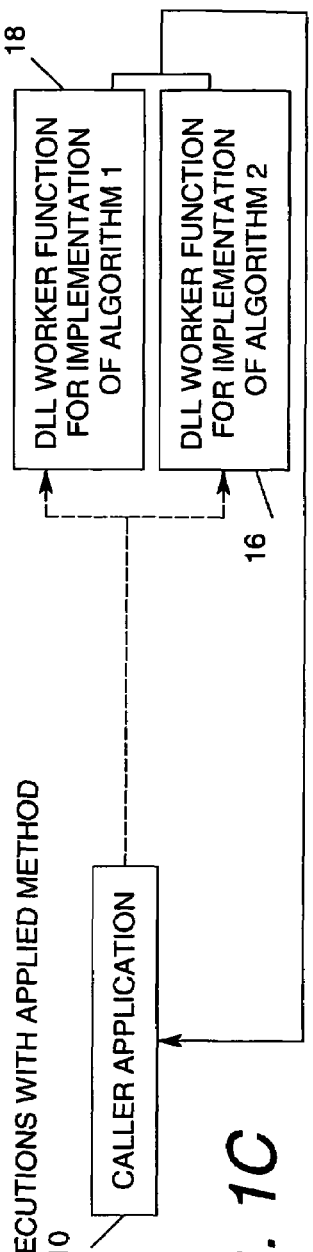
FIG. 1A — NORMAL EXECUTION
FIG. 1B — FIRST EXECUTION WITH APPLIED METHOD
FIG. 1C — SUBSEQUENT EXECUTIONS WITH APPLIED METHOD

METHOD FOR ZERO OVERHEAD SWITCHING OF ALTERNATE ALGORITHMS IN A COMPUTER PROGRAM

BACKGROUND OF THE INVENTION

1. Field of the Invention

This invention involves methods for improving CPU performance by removing the overhead associated with accessing of alternate algorithms in a computer program.

2. Description of Related Art

In certain performance critical regions of code, there is the need to dynamically switch between different implementations of a function with minimal overhead. An example of this would be an operating system or a disk driver selecting different encryption algorithms for a disk file system. The implementations of these different encryption algorithms would typically be located in functions of modular code like a DLL (Dynamically Linked Library). The operating system or disk driver would determine or call some other code to determine which algorithm it needs. It then executes the implementation for this algorithm by loading the module and/or calling the function. This process in the example is time consuming because of the two main factors that incur overhead.

The first factor is the calls into the functions of modular code. The locations of the functions in modular code are fixed and the application needs to resolve the addresses of these functions upon loading/linking the module. This process of loading and linking the module involves redirecting the application to an import/export table, a stub of code that knows the location of the functions, or some other means of resolving the address. In addition, these redirections introduce possible memory stalls, cache misses, and other factors that add latency. Due to these levels of indirection, making calls into functions that reside in modular code has to go through paths that add overhead to the call.

The second factor that incurs overhead is the dynamic switching to the appropriate implementation of the algorithm. Execution of the switching involves conditional branches that yield some uncertainty about the flow of instructions. It is possible that these uncertainties will cause the processor to make branch mispredictions and execute instructions that add latency. All of these factors that contribute to overhead add up and may lead to an unacceptable performance of the application.

It is therefore important to solve the problem of overhead when switching between different implementations. Once an implementation is selected and it is determined that this implementation will always be used by the application from that point on, then we no longer need the ability to dynamically switch between different implementations and an optimization can be made to directly call the implementation without going through the overhead of the dynamic switching process. This invention accomplishes that by providing a method of placing a stub of code at the entry-point of the time critical function. This stub will determine which implementation of the function is to be called in the current environment. The stub will then patch the application so that the application will directly call into this function without the usual overhead.

One related art method to which the method of the present invention generally relates is described in U.S. Pat. No. 5,121,003, entitled "Zero Overhead Self-Timed Iterative Logic". This related art method is a method which uses a third phase to store data, which allows domino logic gates to be cascaded and pipelined without intervening latches. The inputs to this system must have strictly monotonic transitions during the logic evaluation phase and the precharge signal must be active during only the precharge phase. Furthermore, the pipelined system can feed its output back to the input to form an iterative structure. Such a feedback pipeline is viewed as a "loop" or "ring" of logic which circulates data until the entire computation is complete.

The present invention differs from the above prior cited art in that the prior invention, appears to be a hardware design technique for use in self-timed (as distinct from clocked) logic. As such, the prior cited art does not solve the issue of reducing the overhead incurred when linking two software modules together dynamically. The method of the present invention solves the problem of reducing overhead incurred in dynamically linked software modules, whereas the prior cited art, does not.

Another related art method to which the method of the present invention generally relates is described in U.S. Pat. No. 5,513,132, entitled "Zero Latency Overhead Self-timed Iterative Logic Structure And Method". This related art method is a method where a novel third phase of CMOS domino logic is identified and used in the logic system of the invention to store data. The use of this third phase in addition to the normally used precharge and logic evaluation phases, provides a logic structure of cascaded domino logic gates which are pipelined without intervening latches for memory storage. The memory storage function of the conventional latches are provided by the third logic phase. The novel approach requires that the functional inputs to this system have strictly monotonic transitions during the logic evaluation phase, and requires that the precharge signal must be active during only the precharge phase. Embodiments of the pipelined system according to the invention, are structured so that the output of the pipeline are fed back to the input of the pipeline to form an iterative structure. Such a feedback pipeline is viewed as a "loop" or "ring" of logic. The logic ring circulates data until the entire computation is complete. A method for using the logic structure is also described.

The present invention differs from the above prior cited art in that the cited prior invention appears to be a hardware design technique for use in self-timed linkage (as distinct from clocked). As such, this prior cited art also does not solve the issue of reducing the overhead incurred when linking two software modules together dynamically. The prior cited art is a hardware (H/W) technique for designing asynchronous logic, whereas the method of the present invention is a software technique to reduce overhead.

BRIEF SUMMARY OF THE INVENTION

The object of this invention is to provide a method for reducing overhead incurred in dynamically linked software modules.

In order to accomplish this objective, a method of placing a stub of code at the entry-point of the time critical function is initiated. When an application calls this time critical function, it determines the appropriate implementation needed and the stub will resolve the address of this implementation. The stub will then use state information like the return address on the stack or CPU registers to find the application's code that called the function. The stub will then be able to patch the application so that the application will be able to make subsequent calls directly into the implementation. This can be accomplished by patching a DLL (Data Link Library) import table, memory locations used in indirect calls, CPU registers, the call instruction opcodes/parameters itself, and any other means used by the application to make a call. After the patch is made, the application can directly call into the correct implementation determined above, thus incurring minimal overhead for the subsequent calls.

The optimization where the code patches the call itself, removes an additional layer of indirection from the instruction flow. This technique would also work for the general case where both the application and the function called are in the same module, and hence no import table is involved.

BRIEF DESCRIPTION OF THE DRAWINGS

FIGS. 1A, 1B, 1C, show drawings illustrating the process during normal execution, FIG. 1A and the first FIG. 1B, and subsequent executions FIG. 1C, with the applied method.

GLOSSARY ITEMS

Figure 4:
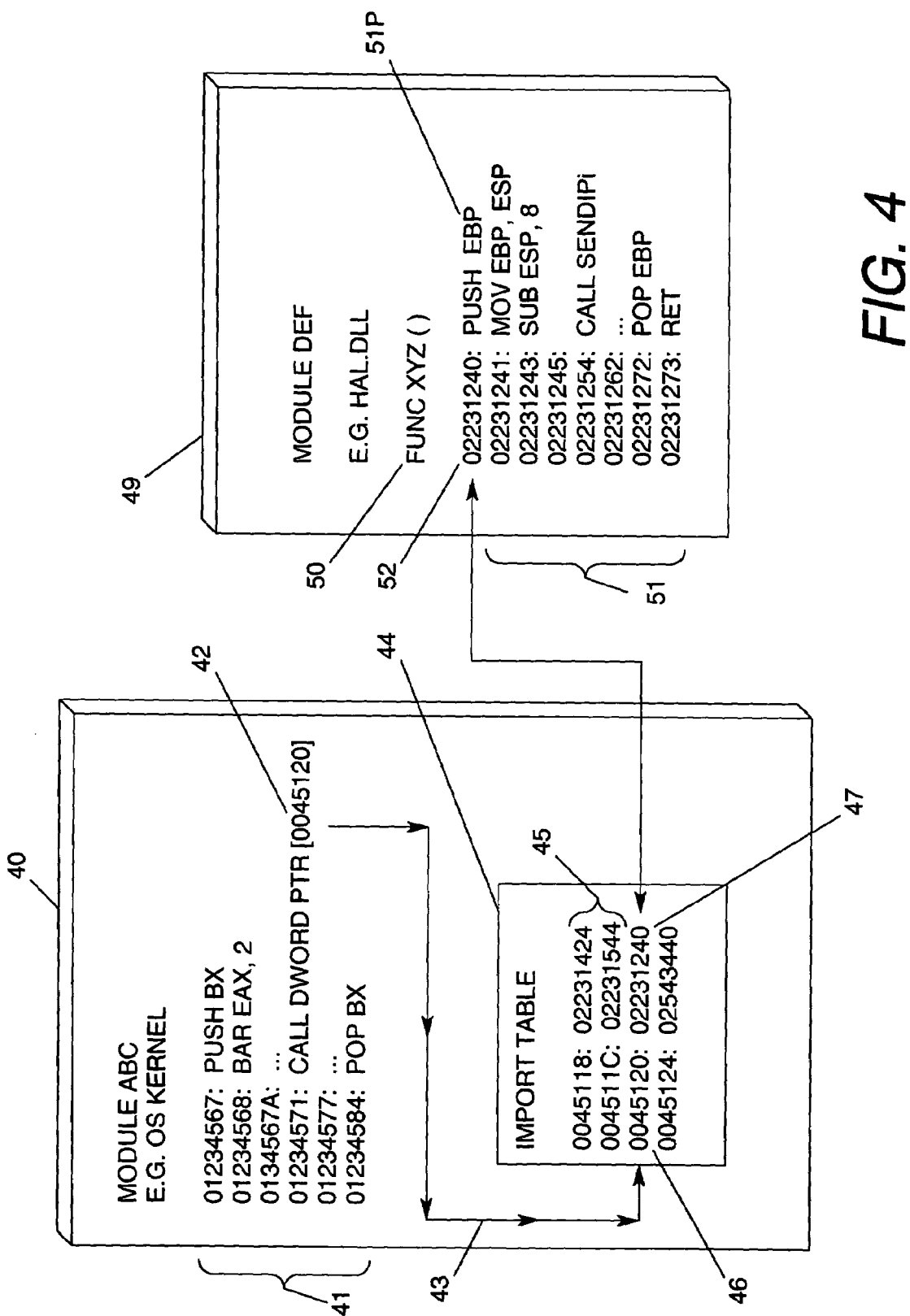
FIG. 4 is a drawing of two modules having an interface of an import table.

1. FUNCTION: A piece of code that contains a set of instructions for the processor to execute.
2. DLL FUNCTION: A function defined inside of a Dynamically Linked Library (DLL) that can be exported to other modules.
3. APPLICATION: In this document, Application refers to an application, program, or piece of code that calls the function that executes the implementation desired.
4. STUB OF CODE: Small piece of code that locates the application's code (by looking at the stack, CPU registers, or in other state information) and patches that code with a direct call to the desired implementation.
5. STACK: A contiguous array of memory that the processor uses to store state and context information as well as a place to pass parameters to a called function.
6. CALL: A branch to a function (also known as procedure, routine, or subroutine).
7. RETURN: A branch out of a function to the instruction after the original call was made.
8. DLL IMPORT/EXPORT TABLE: A table that resolves the addresses of exported functions, pointers, variables, etc. between the application and dynamically linked library.
9. OVERHEAD: Latency incurred in addition to the actual execution of a function. These may be due to memory stalls, branch mispredictions, cache misses, etc caused by inefficiency.
10. HARDWARE ABSTRACTION LAYER (HAL): Software that can access hardware directly and acts as an interface to the Operating System for hardware references.
11. OS INITIALIZATION: The loading or bootstrapping of an operating system.
12. DYNAMIC LINK LIBRARY: Software modules that can be loaded and used by an application. They have the ability to export functions and variables with specialized functionality.
13. TIME CRITICAL FUNCTION: A high performance, specialized function that is called by an application to execute a time critical implementation. An example would be the function to enable and disable peripheral device interrupts. Another example would be the IPI (Inter-Processor Interrupt) function in a multi-processor computer system. In a busy system these functions can be called tens of thousands of times per second. The functions themselves are typically small such that the overhead of calling into the function can be a significant part of the time spent in the function itself.
14. ENTRY POINT: The start of the function.
15. RETURN ADDRESS ON STACK: The address (of the instruction after the original call) that is saved on the stack whenever the processor makes a call into a function. This allows the processor to continue execution after the return of the call.
16. ALGORITHM: Procedure(s) and/or logic for solving a problem.
17. IMPLEMENTATION OF ALGORITHM: A piece of code that represents the procedure(s) and/or logic for solving a problem.
18. ALTERNATE ALGORITHMS: The set of various algorithms that can be used.
19. ZERO OVERHEAD SWITCHING: The process of choosing and executing the desired implementation without unnecessary latency.
20. FUNCTION POINTER: A pointer that points to the address of a function.
21. ASSEMBLER INSTRUCTIONS: Low level machine code instructions that a processor can execute. The size of the instructions can be variable and consists of an opcode and parameters.
22. CPU: Central processing unit. Also referred in this document as the processor.
23. MODULAR CODE: Code that is self-contained and portable and can be used by applications.
24. TIME CRITICAL FUNCTION: A set of code that performs a specific function that needs to finish execution in specific amount of time.
25. ENTRY POINT: Start of a function; the first instruction of a function.
26. SETTING THE VARIABLE: Assigning a value to the variable.
27. TESTING THE VARIABLE: Comparing the value of the variable against another value.
28. DISK DRIVER: Software that manages the disk controller and disks.
29. DE-REFERENCING POINTERS: Obtains the value/data pointed to by the pointer.
30. LOOPS: Consecutive executions of a set of code for a given number of times (especially as it refers to our operations).
31. MODULE ABC: The caller application that calls the exported DLL function in Module DEF. In the example of FIG. 4, this is the Operating System.
32. MODULE DEF:. The Dynamic Link Library (DLL) that contains the DLL function. In the example of FIG. 4, this is hal.dll or the hardware abstraction layer that the operating system uses to access hardware.
33. VARIABLE: An area of memory where data can be stored.

Figure 2:
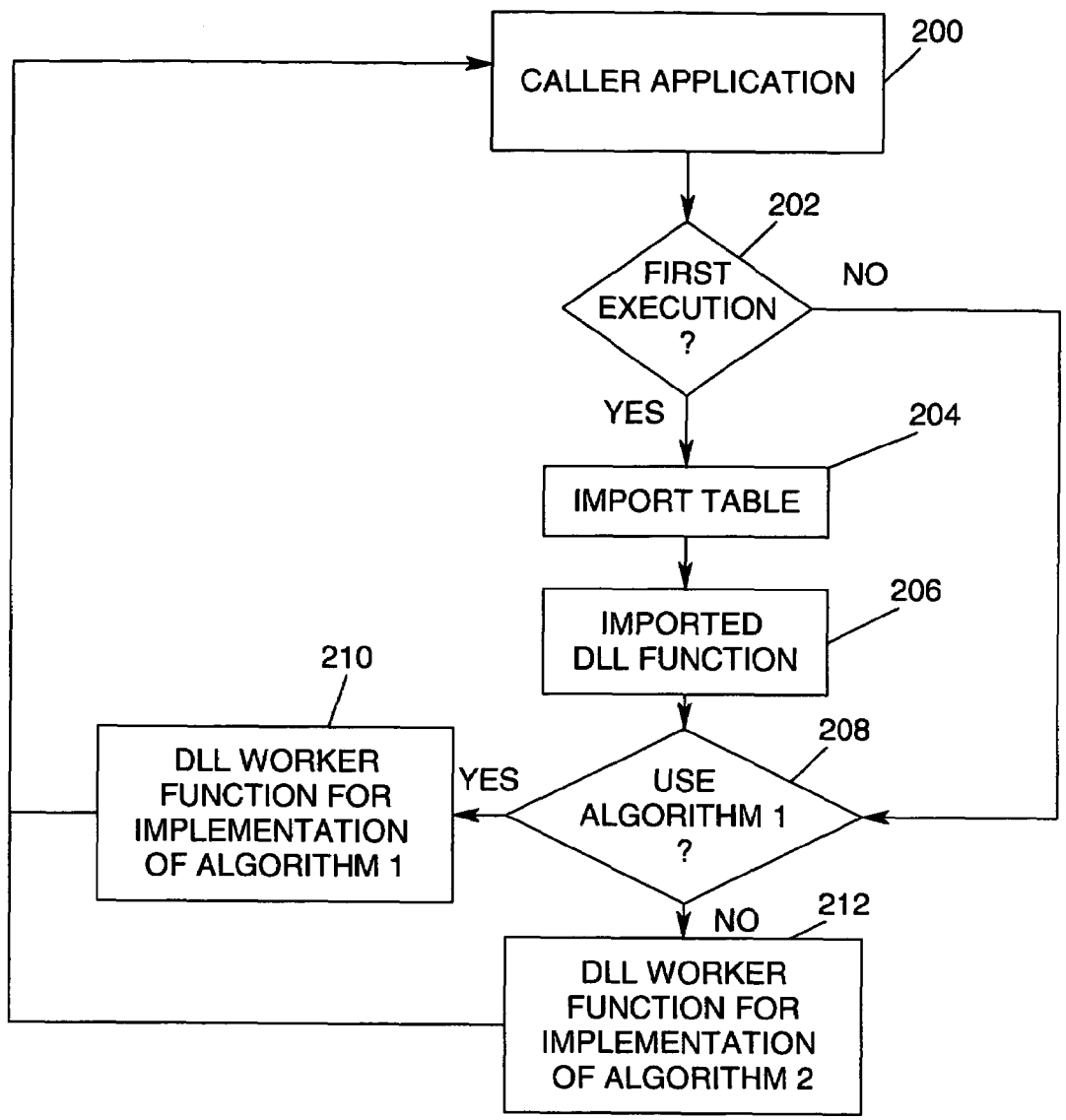
FIG. 2 is a flowchart illustrating the process of the invention and the steps involved.

34. PERFORMANCE CRITICAL REGIONS OF CODE: Regions of code that are executed frequently and need to finish execution under a specific amount of time.
35. A "LARGE" CALLED FUNCTION: A set of code containing a relatively large number of instructions where the time it takes to execute these instructions is significantly longer than the time it takes to call this function.
36. A "SMALL" CALLED FUNCTION: A set of code containing a relatively small number of instructions where the time it takes to execute these instructions is a noticeable percentage of the time it takes to call this function.
37. DIFFERENCE BETWEEN LARGE AND SMALL FUNCTIONS: The number of instructions contained in the functions and the amount of time it takes to execute the instructions.
38. IMPORT TABLE OF THE CALLER: A table that resides in the caller's execution space which consists of addresses of imported functions, variables, and other exports exported by external modules (i.e, DLL's).
39. "ATHLON" ROUTINES: A set of code that performs functions specific to Athlon processors.
40. "CASCADE" ROUTINES: A set of code that performs functions specific to Cascade processors.
41. IMPORTED DLL FUNCTION: A function that has been exported from an external module, such as a DLL that a caller can import.
42. DLL WORKER FUNCTION: In FIGS. 1 and 2, this function contains an implementation of an algorithm. The DLL Worker Function is designed to be called by the DLL Function.

General Overview:

In certain performance critical regions of code utilized by CPU's, there is the need to dynamically switch between different implementations of a function with minimal overhead. An example of this would be an operating system or disk driver selecting different encryption algorithms for a disk file system. The different encryption algorithms would typically be located in modular code like a DLL (Dynamically Linked Library). The operating system or disk driver would determine or call some other code to determine which implementation it needs. It then executes the implementation by loading the module or calling the function.

There are several well-known techniques to accomplish this:

1. A variable can be initialized and then tested at the appropriate points in the code to cause program execution to use the appropriate implementation. For example, a disk driver can use a variable representing an encryption algorithm. Once the initialization part of the disk driver determines the appropriate algorithm to use, it can set the variable to a value that represents the algorithm. Then, various parts of the disk driver can use this variable to switch between implementations. The overhead is the testing of the variable involved in the dynamical switching of implementations.
2. A function pointer (or array of function pointers) can be initialized to the address of the appropriate implementation(s) of the function and the application can execute the implementation through the function pointer(s). The overhead is in the initial decision making of the implementation and the dereference of the function pointer to make the call into the function.
3. Separate libraries (i.e. DLL's) for the different implementations can be created, and the library containing the desired implementation can be loaded at run time by the application. The overhead is in the initial module/library loading and levels of indirection involved in the actual calls into the exports.

Techniques 1 and 2 insert additional instructions (and hence delay) in the programs execution. The additional instructions add overhead due to memory stalls, branch mispredictions, and other delays in testing variables and dereferencing pointers. Where the called functions are "large", the additional delay is usually not a problem and can be tolerated. This is because the time introduced by the delay is a small percentage of the large overall time it takes to execute the function. For example, if a function takes 500 milliseconds to execute and the delay to make the call takes less than 1 millisecond, the delay would only be less than 1%.

Where the called functions are "small", consisting of a few assembler instructions, the additional delay can degrade the performance of the application, when the called function is executed frequently. This is because the call action is now a higher percentage of the overall time it takes to execute the function.

Technique 3 requires that the Operating System or application support dynamic linking of libraries and/or modules.

There is a narrow class of applications where none of these options is optimal. A specific example of this is Windows 2000™ operating system's Hardware Abstraction Layer (HAL) DLL. There are some functions in the HAL that consist of relatively few assembler instructions, that can be called many thousands of times a second in a busy system. To optimize overall system performance, one needs to minimize the overhead in choosing alternate implementations of these functions, as might be required in a HAL that supported multiple different processor architectures (i.e. Pentium III, Pentium IV, etc.).

Techniques 1 and 2 above requires that we modify the Windows 2000™ operating system because the locations of variables and function pointers must be resolved statically at compile time. Technique 3, in general, would allow us to add implementations of alternate algorithms in modules and then dynamically load the modules to provide the application with these algorithms. This means that we only need to modify the HAL (and not the Windows 2000™ operating system) to add the alternate algorithms. Unfortunately, this technique will not work because the choice between the alternate algorithms has to be made very early in OS initialization, prior to the OS being fully initialized and capable of loading and resolving a dynamic link library.

DESCRIPTION OF PREFERRED EMBODIMENT

Figure 9:
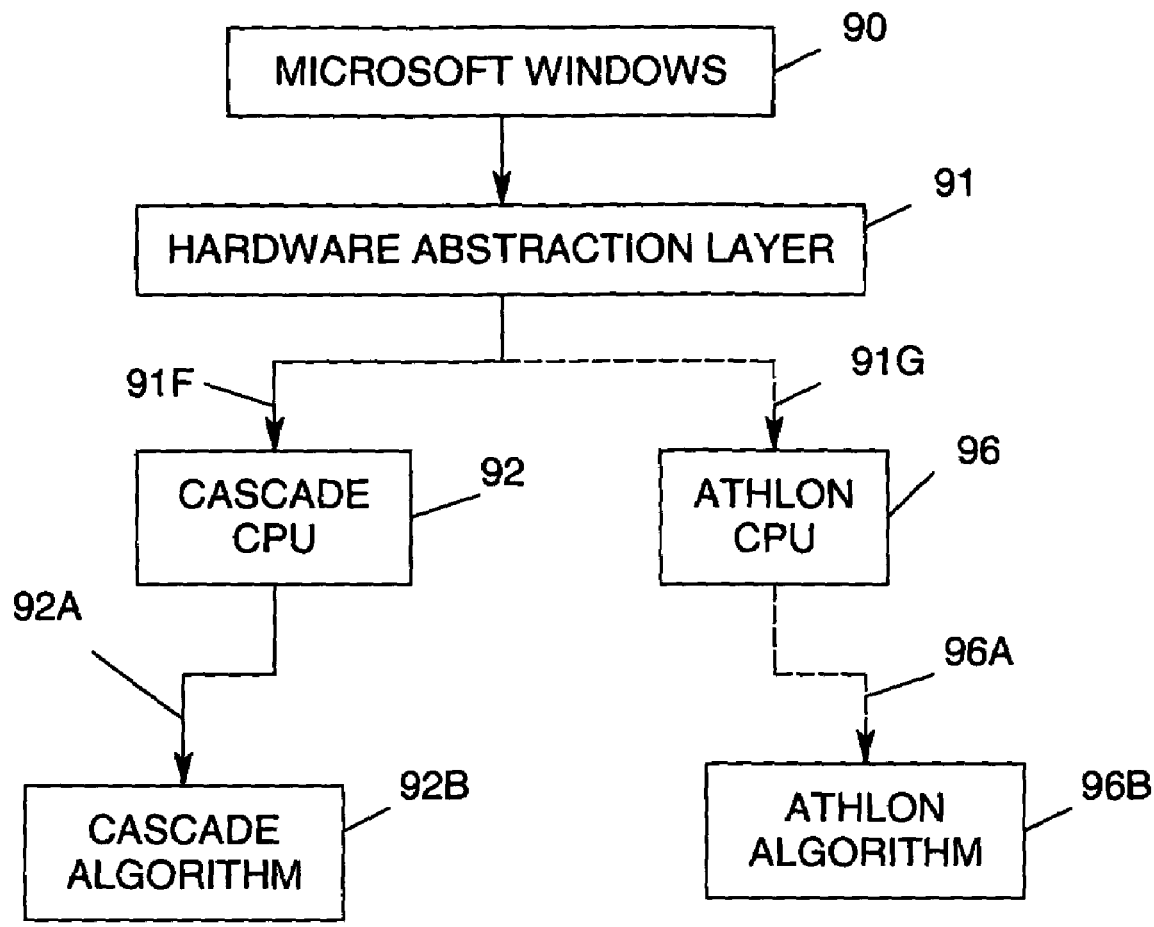
FIG. 9 is a generalized drawing illustrating the environment in which the invention operates.

A generalized sketch of the operating environment is shown in FIG. 9. Here, a Microsoft Windows OS (Operating System) platform 90 provides software to manage system operations and which communicates with a Hardware Abstraction Layer (HAL) 91. The HAL 91 is a software layer used by the Microsoft OS 90 to access physical hardware. The HAL is in the form of a Dynamically Linked Library (DLL) which is responsible for detecting the type of processors which will be utilized for executing either one of the Cascade or Athlon Algorithms.

Line 91*f* is used by HAL 91 to query the CPU 92 for its ID (Cascade).

Line 91*g* is used by HAL 91 to query the CPU 96 for its ID (Athlon).

The CPU 92 is a Cascade processor that executes Intel Pentium III™ (Cascade) specific code. Then, CPU 92 will return information to HAL 91 that it is a Cascade type processor whereby HAL 91 can execute the Cascade Algorithm 92b via line 92a.

The Athlon processor, CPU 96 is a module which executes AND Athlon specific code. AMD represents the American Micro Devices product.

Line 96a indicates that the Athlon CPU 96 returns information to HAL 91 indicating that it is in an Athlon type processor, whereby HAL 91 can now execute the Athlon Algorithm 96b.

Since the Cascade Algorithm 92b only operates for CPU 92 and the Athlon Algorithm only operates for CPU 96, it is necessary for HAL 91 to collect information to determine which CPU will be utilized.

FIG. 1A illustrates a diagram of a typical and optimized procedure for switching between different implementations of a DLL function. In this illustration, an application requires a specific implementation of an algorithm located within an imported DLL function. The application first makes a call into the imported DLL function. The imported DLL function is the entity that will decide and execute the appropriate implementation.

During normal execution, the application (Item 10b) first accesses its DLL import table (Item 22b) to locate the address of the imported DLL function. With the function address resolved, the application then makes the call into the imported DLL function (Item 20b). This imported DLL function will determine which implementation is needed and call the appropriate DLL worker function that contains this implementation. After the imported DLL function (Item 20b) finishes executing the DLL worker function (Item 18b/16b), program execution is returned back to the application (Item 10b). It should be understood that during normal execution the application (10b) has to access its import table (22b) first, then make the call into the DLL function (20b) which executes the appropriate worker function (Item 18b/16b) for the implementation, and finally, return back to the application, 10b. These steps must be completed EACH time data is to be passed.

The second figure, FIG. 1B, describes the applied method where a stub of code is placed at the entry point of the imported DLL function. This stub of code will determine the appropriate implementation needed and change the application to make a direct call into the DLL worker function at FIG. 1C. Subsequent calls into the imported DLL function will actually be calling into the DLL worker function directly.

During the first execution, FIG. 1B, the application (Item 10a) first accesses its DLL import table (Item 22a) to locate the address of the imported DLL function. With the function address resolved, the application then makes the call into the imported DLL function (Item 20a). The imported DLL function executes the stub of code. The stub of code 60 starts by resolving the address of the application's code that made the call (the address resolution used in this example is done by taking the return address found on the stack (FIG. 5) and subtracting the size of the call instruction opcode/parameters to get the address of the original call instruction into this function). The imported DLL function then determines the appropriate DLL worker function for the desired implementation. Finally, the stub of code resolves that DLL worker function's address and modifies the application's code to call into that address instead of the imported DLL function (this allows the application to call directly into the DLL worker function). After the stub of code 60 is done executing, the imported DLL function executes the appropriate DLL worker function (Item 18a/16a) that contains the implementation. After the imported DLL function (Item 20a) finishes executing the DLL worker function, program execution is returned back to the application (Item 10a).

It should be noted that after the first execution, the application only accesses its DLL import table (Item 22a) once, and has direct interaction with the appropriate DLL worker function (Items 18a/16a) thereafter.

In subsequent executions (FIG. 1c), the application (Item 10) can call the appropriate DLL worker function (Item 18/16) directly without first going through the imported DLL function and having it decide first. Once the application has already gone through its DLL import table 22a, there is no need to go through it again. Therefore, the application (Item 10) simply has a direct call to the DLL worker function (Item 16/18) to execute the implementation (FIG. 1C).

Figure 3:
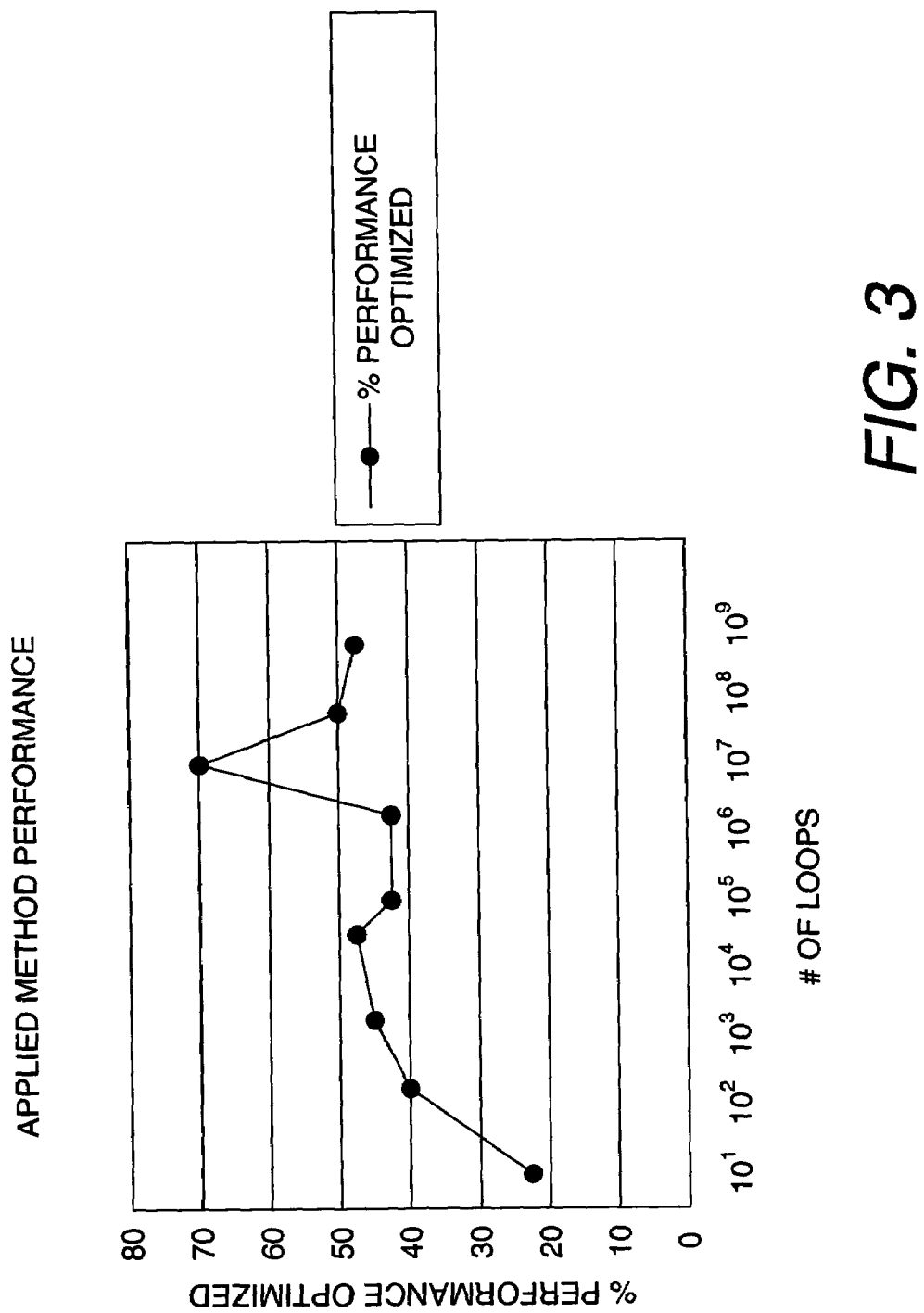
FIG. 3 is a graph which shows the percent improvement in time latency after enabling a direct access to a selected work function for execution by a caller application.

The performance of the normal execution (FIG. 1A) is compared with the subsequent executions (FIGS. 1B, 1C) of the applied method and is shown in FIG. 3. In order to get these performance measurements, the application is modified to repeatedly call the DLL imported function 20a N times (where N is the number of loops shown below on the graph's x-axis) in a loop.

For a few number of loops, the advantages of the applied method aren't enough to make a significant impact in performance. As we move beyond $10^3$ (or 1000) loops, the applied method for calling the implementation performs more than 40% better than the normal execution (FIG. 1A) of calling the DLL imported Function to execute the implementation. (Note: Test system is Intel Pentium N 1300 MHz processor, 400 MHz System Bus, 1 GB RAM; Level 2 cache 1 MB, Level 1 data cache 32 KB, Level 1 instruction cache 32 KB, Packaging microFCPGA/microFCBGA; Type 0, Family 6, Model 9, Stepping 5, Revision 5).

FIG. 2 is a flowchart illustrating the steps involved for the method of the present invention. An application exists (Step 200), and flow of execution will differ depending on if this is the first time called.

If this is the first execution, (step 202) the application (200) accesses the import table (204) to find the address of the Imported DLL function and then calls the function (206). The imported DLL function will then determine if it will use Implementation 1. If this answer is "YES", it will patch the caller's code to do a direct call to DLL Worker Function for implementation of Algorithm 1 (210) and additionally, will call the function. If this answer is "NO", it will patch the caller's code to do a direct call to DLL Worker Function for implementation of Algorithm 2 (212) and call the function. After execution of the implementation is finished, program execution returns to the application (200).

If this is not the first execution at step 202, the application (200) bypasses the import table (204) lookup and simply calls the DLL Worker Function for the implementation of the appropriate algorithm (210/212) already setup in the first execution. After execution of the DLL Worker Function finishes, program execution is returned to the application (200).

FIG. 3 is a graph illustrating the percent improvement occurring in time latency as between the operating loops of FIGS. 1A and 1C. For example, in FIG. 1A the operating loop involves 10b-22b-20b-18b/16b back to 10b.

In FIG. 1C, the operating loop will be seen to be much shorter, that is 10-18/16.

The graph of FIG. 3 illustrates the percent improvement in the speed of execution that FIG. 1C has over operations in FIG. 1A.

In FIG. 3, the Y-axis shows the percent improvement while the X-axis indicates the number of iterative loops involved to achieve the desired performance, i.e. that is—executing the DLL worker function for the implementation of a first Algorithm (Athlon) or second Algorithm (Cascade).

It will be noted that when $10^7$ loop iterations (10,000,000) are required, then there is a 70% improvement in performance.

FIGS. 4 through 8 will illustrate how operations are conducted where a Windows Operating System (OS) 40 (Module ABC) works with an HAL (Hardware Abstraction Layer) DLL (Data Link Library) 49, Module DEF.

Referring to FIG. 4, the Module ABC, 40 such as a Windows OS Kernel will have a coded application 41 wherein item 42 indicates the location address of Import Table 44 (this correlates to 22b of FIG. 1A).

Then access is made via line 43 to the Import Table address 46 which supplies the address 47 of the function desired. Item 45 illustrates various addresses in the Import Table.

The address 47 interfaces to the Nodule DEF 49 in order to contact top (start) 51p of an algorithm of the desired function to be executed as Function XYZ 50. The codes 51 represent the desired function which will utilize either 18b or 16b of FIG. 1A.

Figure 5:
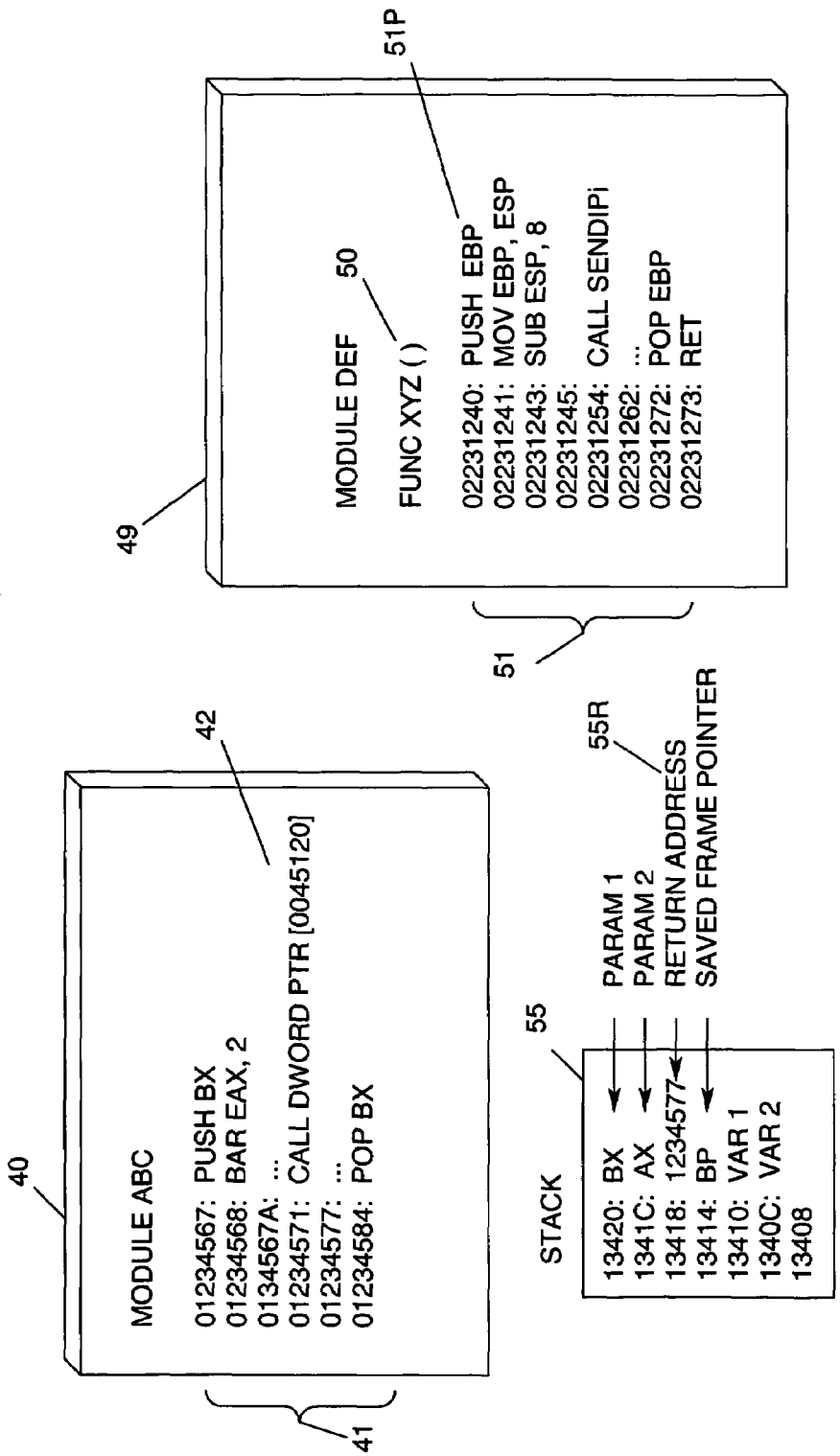
FIG. 5 is a drawing illustrating the stack memory which stores information and parameters for a called function containing instructions for execution by a processor.

FIG. 5 is an illustrative example of the Stack 55 layout after the calling of Module DEF 49 (HAL.DLL) at the Data Link Library which holds function XYZ 50.

Here the Application 10a (FIG. 1B) is seen at item 41 where it holds an address 42 which addresses the location of the Import Table 22a (FIG. 1B).

A stack 55 has a Return Address 55r which is used to return to the Application 10a (FIG. 1B).

Figure 7:
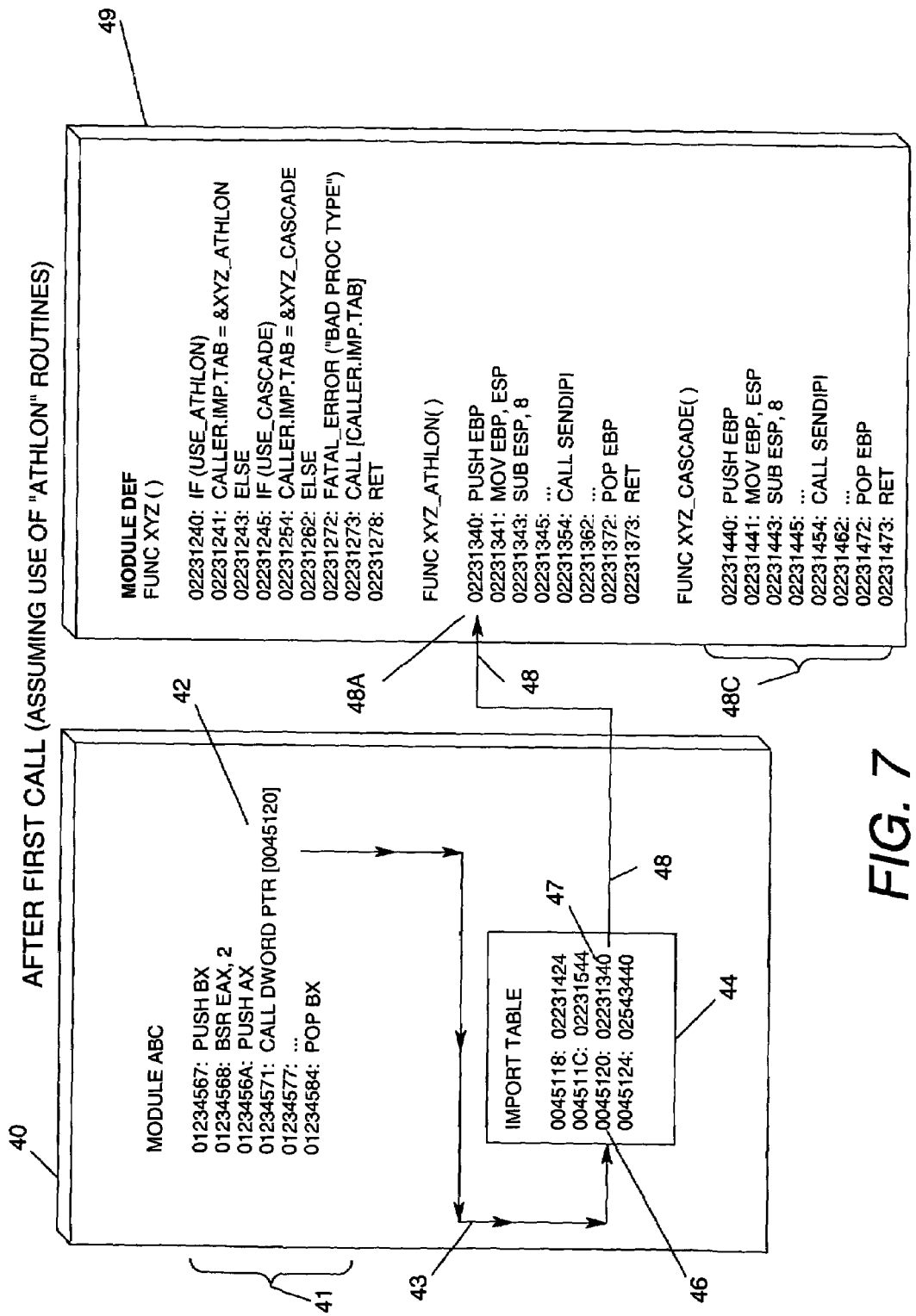
FIG. 7 is a drawing showing the import table for connection of two separate modules of code.
Figure 8:
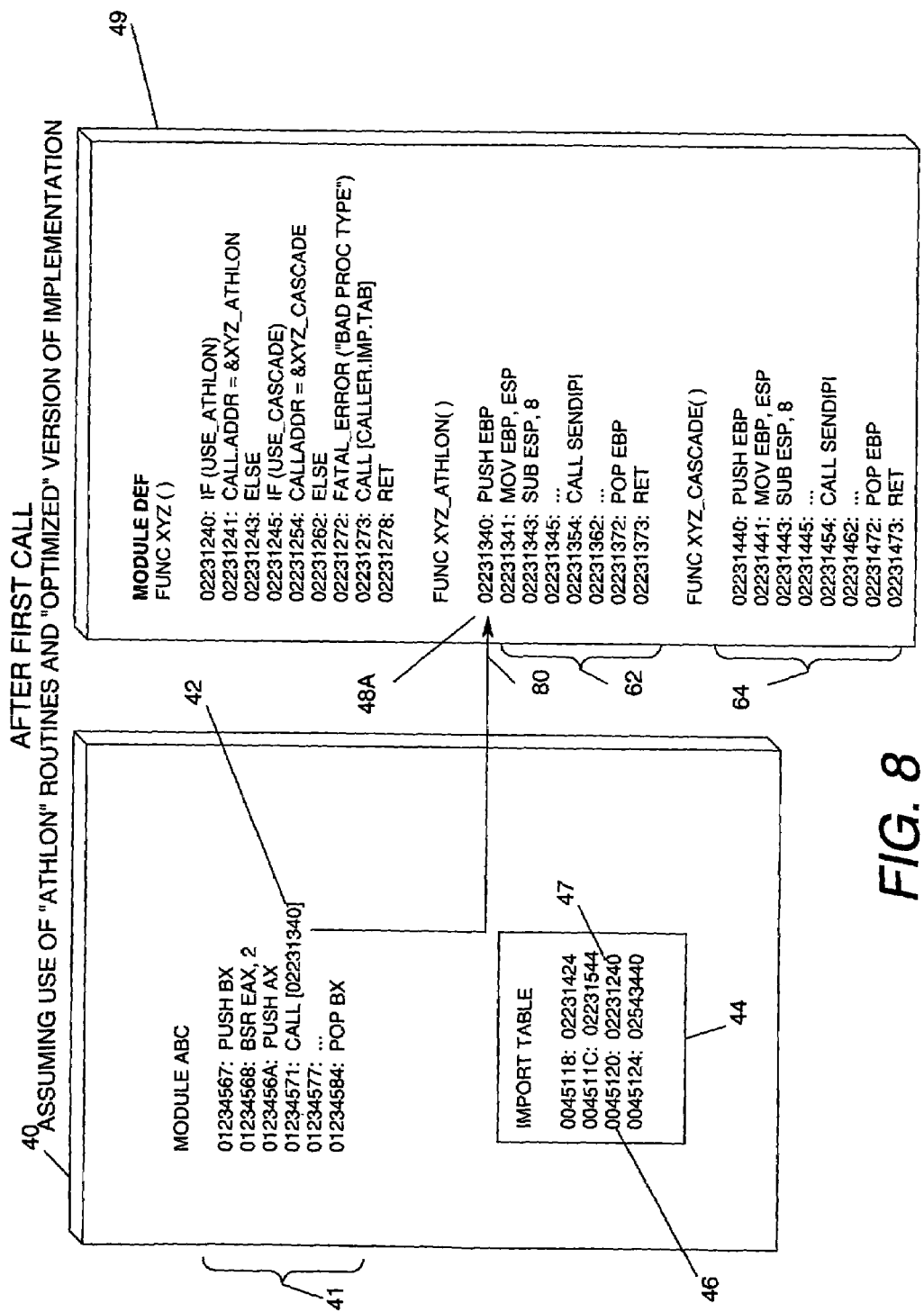
FIG. 8 is a drawing which bypasses the import table for direct access to the second code module after the First Call.

A stub 60 in the imported DLL Function 20a (FIG. 1B) will access DLL Worker Function 18a or 16a for return to Application 10a which is item 41 in Module ABC 40 (Windows OS). The code for stub 60 is seen in FIGS. 6, 7 and 8.

Module DEF 49 (HAL DLL) shows Function XYZ 50 which has Algorithm Code 51 to be executed. This code starts at item 51p.

Figure 6:
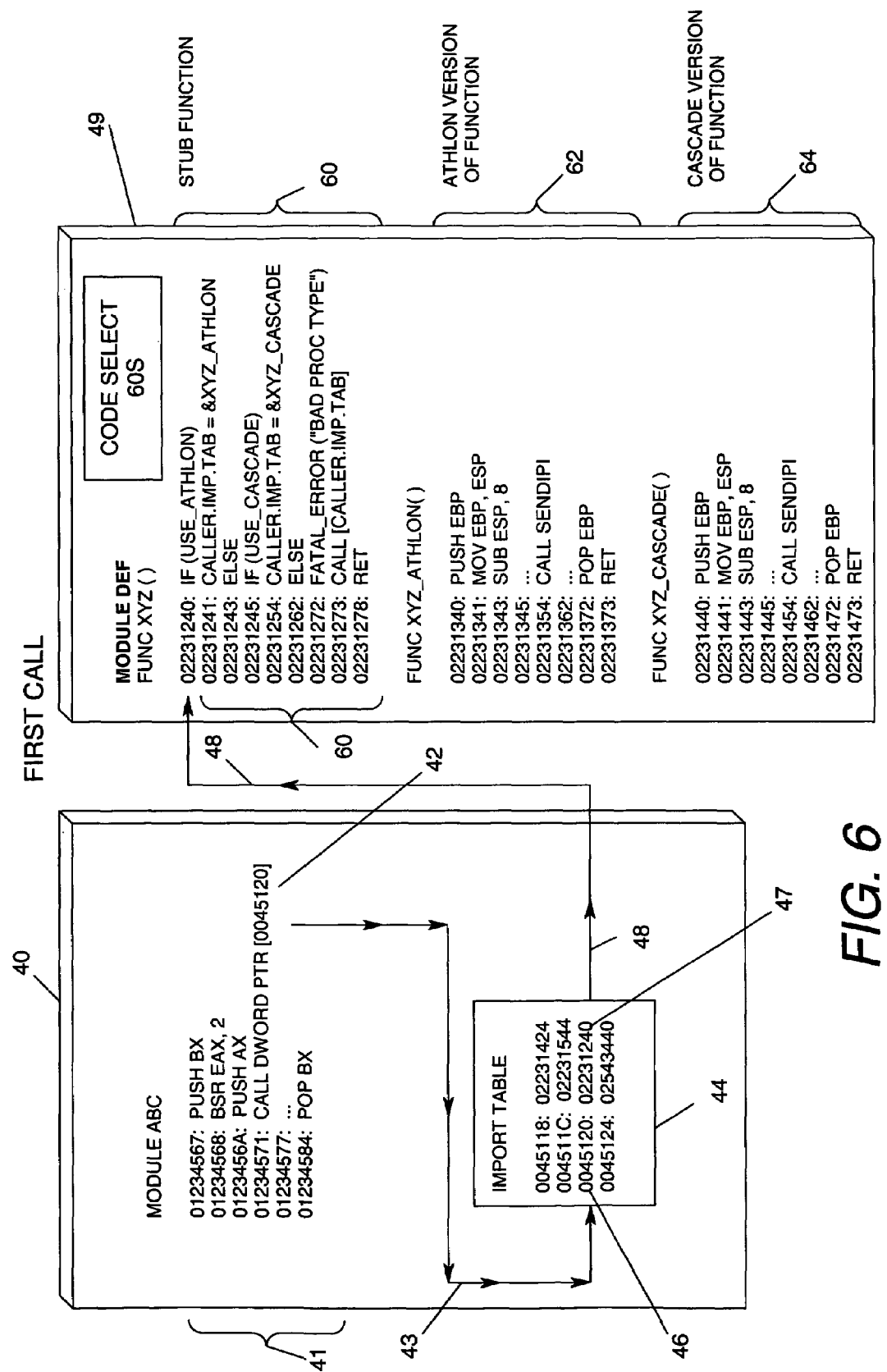
FIG. 6 is a drawing showing the First Call between two modules of code.

FIG. 6 illustrates the First Call from Module 40 to Module 49 (Function XYZ).

The Windows OS at Module ABC 40 holds code for Application 10a (FIG. 1B). Here at item 41, there is selected the address of the Import Table 44 Entry via line access 43 where item 46 (0045120) is selected which provides item 48 as the address of the function to be called.

Line 48 shows the access to a stub 60 which can be made to select 02231240 for the Athlon code (Funct XYZAthlon) or for the Cascade Code (Funct XYZ Cascade) 02231440. Thus the stub function 60 can select a first Algorithm 62 (Athlon) or a second Algorithm 64 (Cascade).

Block 60s is the determining factor as to whether Stub 60 will select 62 or 64. Normally the default choice is to select 62 (Athlon).

After the First Call in FIG. 6, then FIGS. 7 and 8 illustrate two different scenarios of FIG. 6.

In FIG. 7, the application to work with code at item 41 in Windows OS Module 40 will provide an Address 42 to use line 43 to access the Import Table 44. The access at 46 will provide Address 47 which is the Address of the Athlon function, where 48a is the start of the code for the Athlon algorithm. Note that address 48c for the code of Cascade was not accessed. Thus now, the execution of the Athlon Algorithm can take place.

In FIG. 8, there is seen the "optimized" version of FIG. 6 where the Application 10 (FIG. 1C) at item 41 provides the Address, at 42, which operates directly via line 80 over to item 48a to execute the Athlon Algorithm, at area 62. Note that here the Import Table 44 has been bypassed for direct access to the Funct XYZ (Athlon).

However, should the Cascade Algorithm be required, then the address 02231440 at the top of area 64 (FIG. 8) could be accessed for execution of the Cascade Algorithm.

While one embodiment of the described system and method has been illustrated, it should be understood that the invention may be implemented in other embodiments as defined in the attached claims.

What is claimed is:

1. In a computer system having a Windows operating system which provides a Dynamic Link Library that is called by a Windows application for performing a selected worker function, wherein the selected worker function is selected by first accessing an import table provided for use by said application, a method for reducing latency in the calling of said worker function by said application when said selected worker function is a time-critical worker function and said application is a multiple-iteration application which requires multiple iterations of said time-critical worker function, said method comprising:

accessing by said multiple-iteration application of said import table to locate an address of said time-critical worker function;

calling by said multiple-iteration application of said time-critical worker function in response to the address located by said accessing;

executing the called time-critical worker function and also, on the first call of said time-critical worker function by said multiple-iteration application, utilizing a stub of code provided at the entry point of said time-critical worker function for patching the multiple-iteration application to said time-critical worker function by modifying said multiple-iteration application so that the multiple-iteration application will bypass said import table and directly call said time-critical worker function on subsequent iterations without having to access said import table; and returning operation to said multiple-iteration application after completion of said time-critical worker function.

2. The method of claim 1, wherein said Dynamic Link Library is incorporated in a Hardware Abstraction Layer for use in selecting which of a plurality of different processor types is to be called by said multiple-iteration application.

3. The method of claim 1, wherein said Dynamic Link Library is used for selecting different encryption algorithms for a disk drive system.

4. The method of claim 1, wherein said method is repeated when a different multiple-iteration application calls a time-critical function in said Dynamic Link Library.

5. The method of claim 1, wherein said stub of code uses a return address of said multiple-iteration application to determine a location of the code in said multiple-iteration application which called the time-critical worker function.

6. The method of claim 1, wherein said return address is obtained from a memory stack provided for use with said application.

* * * * *